United States Patent
Hwang

(10) Patent No.: US 11,768,320 B2
(45) Date of Patent: Sep. 26, 2023

(54) REFLECTIVE GLITTER HEAT TRANSFER SHEET COMBINED WITH A RETROREFLECTIVE STRUCTURE AND METHOD OF MANUFACTURING SAME

(71) Applicant: MS-KOREA CO., LTD., Gwangju-si (KR)

(72) Inventor: Kun Lee Hwang, Hanam-Si (KR)

(73) Assignee: MS-KOREA CO., LTD., Gwangju-si (KR)

( * ) Notice: Subject to any disclaimer, the term of this patent is extended or adjusted under 35 U.S.C. 154(b) by 297 days.

(21) Appl. No.: 16/924,646

(22) Filed: Jul. 9, 2020

(65) Prior Publication Data

US 2021/0373209 A1    Dec. 2, 2021

(30) Foreign Application Priority Data

May 26, 2020   (KR) .................. 10-2020-0062737

(51) Int. Cl.
| | | |
|---|---|---|
| *G02B 5/02* | (2006.01) | |
| *G02B 5/12* | (2006.01) | |
| *G02B 5/136* | (2006.01) | |

(52) U.S. Cl.
CPC .......... *G02B 5/136* (2013.01); *G02B 5/0242* (2013.01); *G02B 5/0284* (2013.01); *G02B 5/12* (2013.01)

(58) Field of Classification Search
CPC .......... G02B 5/00; G02B 5/02; G02B 5/0205; G02B 5/021; G02B 5/0215; G02B 5/0221; G02B 5/0226; G02B 5/0231; G02B 5/0236; G02B 5/0242; G02B 5/0284; G02B 5/12; G02B 5/122; G02B 5/124; G02B 5/126; G02B 5/128; G02B 5/136

USPC .......................................... 359/515–553, 599
See application file for complete search history.

(56) References Cited

U.S. PATENT DOCUMENTS

| | | | | |
|---|---|---|---|---|
| 2,592,882 A * | 4/1952 | Fisher | ................... | G02B 5/128 |
| | | | | 156/276 |
| 5,631,064 A * | 5/1997 | Marecki | ................ | G02B 5/128 |
| | | | | 359/518 |
| 6,217,252 B1 * | 4/2001 | Tolliver | ................ | C09D 5/004 |
| | | | | 523/172 |
| 6,306,459 B1 * | 10/2001 | Fleming | ............... | A41D 31/325 |
| | | | | 427/163.4 |
| 2004/0217702 A1 * | 11/2004 | Garner | ................ | H01L 51/5275 |
| | | | | 445/24 |

FOREIGN PATENT DOCUMENTS

| | | |
|---|---|---|
| EP | 0811 858 A2 * | 12/1997 |
| KR | 100864523 | 10/2008 |
| KR | 101766428 | 8/2017 |

\* cited by examiner

*Primary Examiner* — Thong Q Nguyen
(74) *Attorney, Agent, or Firm* — CANTOR COLBURN LLP

(57) ABSTRACT

Provided is a reflective glitter heat transfer sheet having a retroreflective structure. The reflective glitter heat transfer sheet includes: a reflective glitter layer comprising an adhesive, and glass beads and glitter particles embedded inside the adhesive; a primer layer disposed on the reflective glitter layer; and a hot melt layer formed on the primer layer for conducting heat transfer to an article to which the reflective glitter heat transfer sheet is to be applied. Each of the glass beads is a retroreflector for achieving retroreflection, and each of the glitter particles is a reflector for achieving diffuse reflection.

2 Claims, 5 Drawing Sheets

REFLECTIVE GLITTER HEAT TRANSFER SHEET COMBINED WITH A RETROREFLECTIVE STRUCTURE AND METHOD OF MANUFACTURING SAME

BACKGROUND OF THE INVENTION

Field of the Invention

The present invention relates to a reflective glitter heat transfer sheet having a retroreflective structure, which is capable of obtaining both a retroreflective effect and a decorative effect by combining the glitter particles, which reflect light at angles different from each other, with glass beads, which retrospectively (reversely) reflect the light incident from a light source toward the light source.

Description of the Related Art

Glitter refers commonly to small reflective particles, and is released in various shapes and colors. Glitter particles reflect light at different angles (also called "diffuse reflection") to make the surface thereof shiny or shimmering (gleaming). Use of the glitter is long and dates back to prehistoric times. Modern glitter is usually made of plastic and is rarely recycled, causing environmental pollution.

Today, more than 20,000 types of the glitter are reported to be manufactured using a huge number of colors, sizes and materials. Commercial glitter is usually released to have surfaces each being over a range of 0.05 to 6.35 mm. The glitter typically begins to be manufactured by first combining plastic, coloration, and reflective materials (for example, aluminum, titanium dioxide, iron oxide, and the like) and producing a flat multilayer sheet. Then, this multi-layer sheet is cut into small particles of various shapes such as squares, triangles, rectangles, rhombuses, stars, and the like to obtain the glitter.

The use of glitter spans a wide range of fields and is used for decoration in many places, including packaging, clothing, human bodies, and sporting goods. In particular, related to the present invention, the glitter refers to a sheet form attached to a fabric or film having a constant sized surface area using an adhesive and, more specifically, means a reflective glitter sheet provided with heat transfer means. As such a glitter sheet, for example, Korean Patent No. 10-0864523 may be enumerated. The patent invention above discloses a resin film 10 including glitter, and glitter sheet paper including an adhesive layer 20 coated on the resin film, wherein the sheet paper is cut into a desired shape and attached to a desired place to be applied.

A retroreflector is a substance that refracts light, that is, light rays, which is incident on the retroreflector (in the case of glass beads) from a light source, reflects the light rays internally, and then refracts again the light rays being transferred toward the light source from the retroreflector, thereby retrospectively (reversely) reflecting the light toward the light source through a path parallel to the incident light. The glass beads are usually released in a sheet form by providing a glass bead layer using an adhesive on a carrier film (or sheet), and the sheet provided with the glass beads is processed into a desired shape or pattern and is attached to a road sign or a firefighter uniform, whereby the visibility is greatly enhanced and the safety is increased. Therefore, when retroreflectors are applied to clothing worn by people such as environmental sanitation workers, firefighters, police, factory workers, construction site workers, safety workers in each area, and the like working on roads or dangerous places, the position of the wearer may be surely identified by pedestrians or drivers, thereby obtaining a great effect on the protection and safety of the wearer.

As a conventional technique for increasing an overall reflection efficiency by using a diffuse reflection (glitter) and a retroreflection (retroreflector) together, Korean Patent No. 10-1766428 may be mentioned. The patent invention above relates to a diffuse reflection coating composition for sprays and discloses a composition ratio of glitter and glass beads. Since the spray method is adopted, when applied to the desired target article, the glitter and glass beads are sprayed on the applied product and arbitrarily mixed and attached.

The foregoing is intended merely to aid in the understanding of the background of the present invention and is not intended to mean that the present invention falls within the purview of the related art that is already known to those skilled in the art.

DOCUMENTS OF RELATED ART

Patent Documents (Patent Document 1) Korean Patent No. 10-0864523
(Patent Document 2) Korean patent No. 10-1766428

SUMMARY OF THE INVENTION

Accordingly, the present invention has been made keeping in mind the above problems occurring in the related art and is intended to provide a reflective glitter heat transfer sheet that provides excellent visibility by significantly enhancing the reflection effect occurring between the retroreflector and the glitter particles by providing the reflective glitter heat transfer sheet having a retroreflective structure. The reflective glitter heat transfer sheet includes glass beads arranged in an adhesive attached to a carrier film, and a reflective glitter layer having glitter particles. The glass beads and the glitter particles are held in a state of being arranged in the adhesive by the adhesive, each of the glass beads is a retroreflector for achieving retroreflection, and each of the glitter particles is a reflector for achieving diffuse reflection. A hot melt layer is provided as a means for conducting heat transfer to the article to which the reflective glitter heat transfer sheet is to be applied.

When the reflective glitter layer is provided, the glass beads and the glitter particles are provided together in the adhesive provided on the carrier film so that a refraction change of light in the adhesive excluding the glass beads and the glitter particles is uniformly maintained. In addition, since the reflective glitter layer contains the glass beads and the glitter particles, light (light rays) originated from the light source is transferred to the glass beads and the glitter particles, the glass beads and the glass beads, and the glitter particles, in various paths, whereby diffuse reflection and/or retroreflection is obtained. Through such transfer and reflection of the light, the reflection effect by the glitter particles is maximized to obtain a high-brightness reflective glitter sheet.

As such, the reflective glitter sheet according to the present invention obtains double reflection effects of diffuse reflection by the glitter particles and retroreflection by the glass beads, thereby providing a reflective sheet having high and excellent visibility.

Furthermore, another objective and challenge of the present invention are to provide a reflective glitter heat transfer sheet that can be easily applied through heat transfer in various life fields such as clothing, furniture, or the like by additionally providing the hot melt layer on the reflective glitter sheet according to one embodiment of the present invention.

In order to achieve the above objective according to exemplary embodiments of the present invention, there may be provided the reflective glitter heat transfer sheet having the retroreflective structure, the reflective glitter heat transfer sheet including: a reflective glitter layer having glass beads and glitter particles arranged in an adhesive attached to a carrier film. The glass beads and the glitter particles may be held in a state of being arranged in the adhesive by the adhesive, each of the glass beads may be a retroreflector for achieving retroreflection, and each of the glitter particles may be a reflector for achieving diffuse reflection. A primer layer may be disposed on the reflective glitter layer, and a hot melt layer may be provided on the primer layer for conducting heat transfer to an article to which the reflective glitter heat transfer sheet is to be applied.

The reflective glitter layer may be obtained by allowing the glass beads to be sprayed to be attached to the adhesive provided on the carrier film, and then allowing the glitter particles to be consecutively sprayed to be attached. Alternatively, the reflective glitter layer may be provided by allowing the glass beads and the glitter particles to be mixed and then sprayed to be attached to the adhesive provided on the carrier film.

The primer layer provided on the reflective glitter layer may serve to stably keep the glass beads and glitter particles on the adhesive and, on the other hand, may serve to keep the overall form of the elements constituting the sheet when the glitter heat transfer sheet is applied to clothing or shoes. Means for conducting heat transfer to the article to which the reflective glitter heat transfer sheet is to be applied may be provided through a hot melt layer provided following the primer layer.

The reflective glitter heat transfer sheet having the retroreflective system according to the present invention having such a configuration may obtain a retroreflective effect through the glass beads on the one hand and the glass beads and glitter particles on the other hand. Accordingly, a double retroreflective function may be obtained, thus maximizing the retroreflective effect, thereby obtaining a reflective sheet having excellent visibility. In addition, the diffuse reflection may be obtained through the glitter particles.

In detail, according to the reflective glitter sheet of the present invention, some of the light (light rays) originated from the light source may be refracted while entering as the incident light to the front surface of the glass bead and refracted again while exiting through the rear surface of the glass bead, thereby colliding with the glitter particle. The light collided with the glitter particles may be reflected and then refracted while entering again to the rear surface of the glass beads, and refracted once again while exiting through the front surface of the glass beads, thereby being retrospectively (reversely) reflected toward the light source in a direction parallel to the incident light.

On the other hand, some of the light transferred from the light source may be: refracted while being incident through the front surface of the glass bead; reflected on a surface of rear side of the glass bead; and then refracted again while exiting through the front surface of the glass bead, thereby being retrospectively (reversely) reflected toward the light source in a direction parallel to the incident light. At this time, the incident light may not reach the glitter particle, and retroreflection may be performed in the glass bead.

As described above, the reflective glitter sheet according to the present invention is implemented by being having a retroreflective structure (system), and a process in which the light rays from the light source are transferred to the glitter particles and reflected therefrom is accomplished in a state of being controlled through the glass beads, whereby an excellent glitter reflection effect with high luminance can be obtained. This is because, when light rays transferred from the light source are directly transferred to and reflected by the glitter particles, diffuse reflection (scattered reflection) occurs, so that a certain degree of glittering effect can be obtained, but high-brightness glitter is difficult to obtain. According to the present invention, by placing the glass beads in front of the glitter particles, the incident light obtained from the light source is refracted toward the glitter particles located at the rear side of the glass beads, and the light reflected from the glitter particles is refracted again through the glass beads, thereby providing a retroreflective effect to be maximized.

Furthermore, some of the light rays from the light source are incident and refracted in the glass beads, and then reflected and refracted inside each of the glass beads, thereby retrospectively reflecting toward the light source, whereby the reflection effect, that is, the visibility, is doubly enhanced by that much.

In addition, since a reflective glitter sheet is provided in a shape of a heat transfer sheet, a wide range of product applicability can be easily obtained.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Hereinbelow, the present invention will be described in detail with reference to the accompanying drawings.

Figure 1:
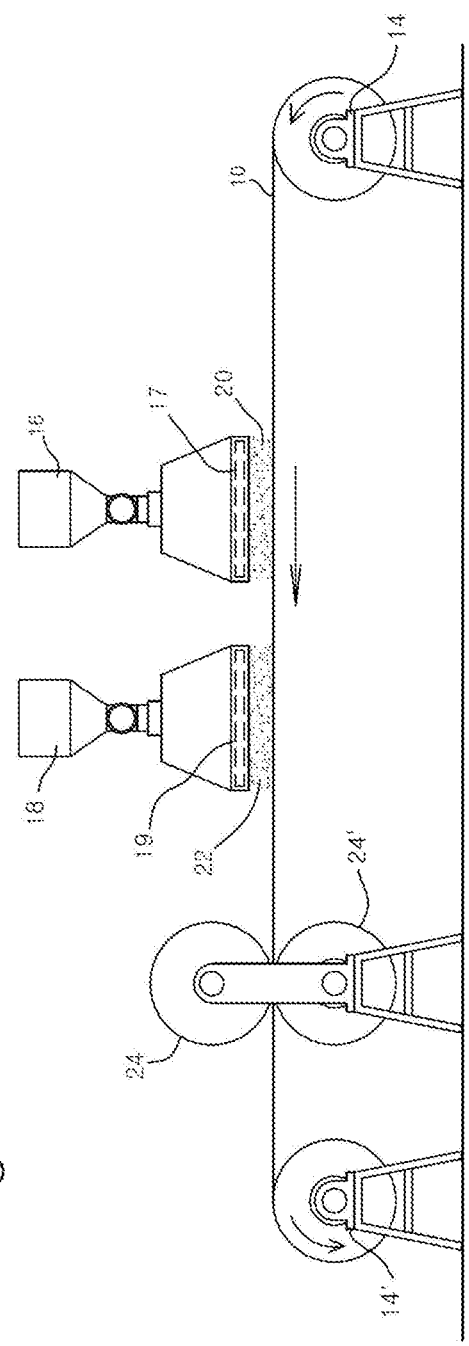
FIG. 1 is a schematic process diagram showing an overall process of manufacturing a reflective glitter heat transfer sheet having a retroreflective structure (system) according to an embodiment of the present invention.

With reference to FIG. 1, there is shown a schematic process diagram showing an overall process of manufacturing a reflective glitter heat transfer sheet having a retroreflective structure (system) according to the present invention. The reflective glitter heat transfer sheet according to the present invention starts to be provided from preparing a carrier film (base film) 10. A sheet-like adhesive 12 (see FIG. 2) is provided on one entire surface of the carrier film 10 along with the carrier film having a release layer (delamination layer). While a process of unwinding and winding the carrier film 10 from a right side (winder 14) to a left side (winder 14') proceeds, the carrier film 10 provided with the adhesive 12 above moves at a constant speed between two winders 14 and 14'. The carrier film 10 is usually prepared by molding 75 μm thick polyethylene terephthalate (PET) in a shape of a fabric sheet, and the adhesive 12 using silicone or acrylic is applied or attached to one surface (front surface or top surface in FIG. 1) of the carrier film 10 in the form of a thin film. The release layer that is attached to an opposite surface of the adherend surface where the carrier film 10 and the adhesive 12 are in contact with each other is removed for further work. The carrier film 10 may be replaced with a laminated film of PET and polyethylene (PE) with an adhesive in-between. PE is generally used for retroreflective heat transfer films.

While the carrier film 10 is moved between the winders 14 and 14', the glass beads 20 contained in a hopper 16 are dropped onto the adhesive 12 attached to the carrier film 10. The glass beads are filtered through a filter mesh 17 of 200-250 meshes and then sprayed on the adhesive 12 attached to the carrier film 10 to be settled on the adhesive.

While the carrier film 10 on which the glass beads 20 are provided is continuously moved, the glitter powder 22 is added subsequently right away. The glitter powder 22 is dropped from a hopper 18 onto the glass beads 20 attached to the adhesive 12 through a filter mesh 19 of 200 to 250 meshes.

Figure 3:
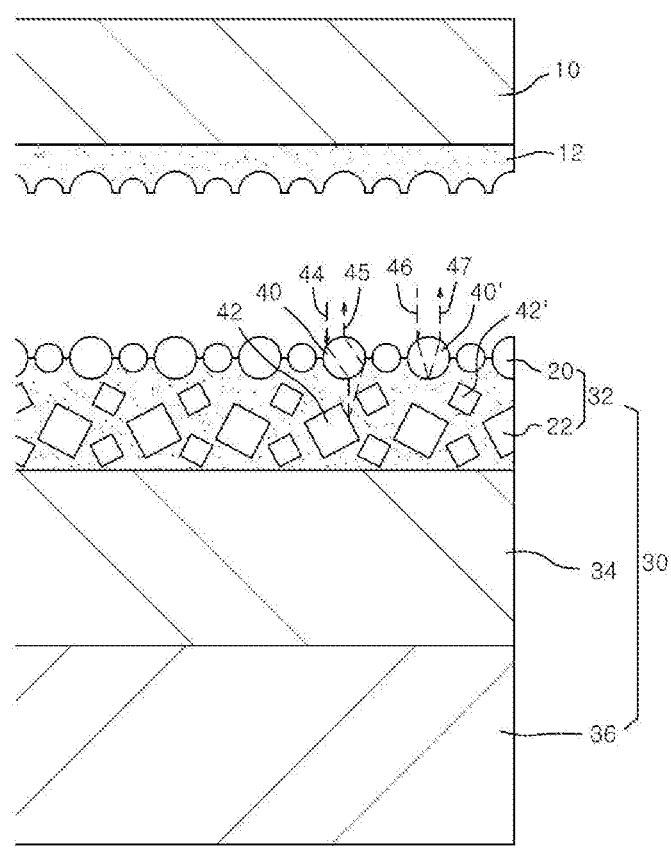
FIG. 3 is a schematic partially enlarged sectional view showing a process in which reflection occurs between glass beads and glitter particles when the heat transfer sheet of the present invention is applied to a desired product.

As such, while the carrier film 10 provided with the adhesive 12 is moved between the winders 14 and 14 the carrier film 10, to which the glass beads 20 and the glitter powders 22 are attached, continues passing between a pair of rollers 24 and 24' through a continuous process. While passing between the rollers 24 and 24', the glass beads 20 and the glitter powders 22 provided on the carrier film 10 are more stably attached to and embedded inside the adhesive 12 provided on the carrier film 10, as shown in FIG. 3.

Figure 2:
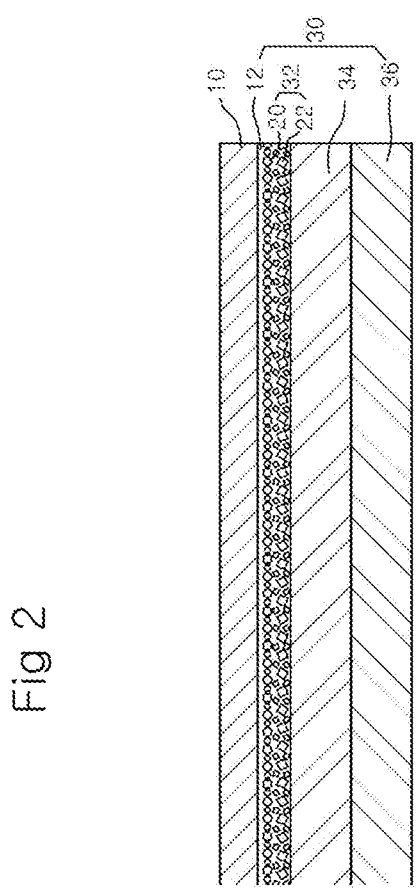
FIG. 2 is an enlarged sectional view showing the reflective glitter heat transfer sheet having the retroreflective structure according to the present invention.

Referring to FIG. 2, when remaining layers 34 and 36 such as the primer layer are provided, the operation of forming the layers 34, 36 proceeds in the same way as providing a usual plastic or resin layer, without using glass beads or particles such as the glitter.

FIG. 2 is an enlarged sectional view showing the reflective glitter heat transfer sheet having the retroreflective structure according to the present invention. When the reflective glitter heat transfer sheet 30 is finally applied to an application product, the carrier film 10 is removed from the reflective glitter heat transfer sheet 30. According to an embodiment of the present invention, as described with reference to FIG. 1, using the adhesive 12 attached to the carrier film 10, the glass beads 20 are first sprayed on and attached to the adhesive 12 and the glitter powders 22 are subsequently sprayed on and attached to the glass beads 20, whereby the reflective glitter layer 32 is obtained. The glass beads 20 and the glitter powder 22 attached to the adhesive 12 are more stably attached to the adhesive 12 by passing between the rollers 24 and 24'. Through such a process, the glass beads 20 are arranged in the adhesive 12 adjacent to the carrier film 10, and the glitter powders 22 are arranged in the adhesive 12 far away from the carrier film 10.

As the primer layer 34 is provided under the reflective glitter layer 32 (based on the drawing), even though the glitter particles (that is, glitter powders 22) are not sufficiently attached to the adhesive 12 due to a relation with the glass beads 20 when obtaining the reflective glitter layer 32 by spraying the glitter powders 22 over the glass beads 20, such defects are compensated later by providing the primer layer 34 through a primer coating operation.

A skin resin layer (not shown) using a skin resin may be further provided on the primer layer 34. Whereas the primer layer 34 is for embedding the glass beads 20 and the glitter powders 22 inside the adhesive 12, the skin resin layer may be provided to maintain an overall shape of the components constituting the reflective glitter heat transfer sheet 30 when the reflective glitter heat transfer sheet 30 is applied to the clothing or shoes. Of course, by providing the primer layer 34 to a predetermined thickness, the role of the skin resin layer may be obtained together. Lastly, the hot melt layer 36 is provided, thereby obtaining a reflective glitter heat transfer sheet 30 capable of conducting heat transfer.

When the reflective glitter heat transfer sheet 30 manufactured as described above is applied to the final desired product such as clothing or shoes, a desired pattern or design is cut along the edge of the hot melt layer 36 through a cutting process, thereby allowing the reflective glitter heat transfer sheet to conduct heat transfer to the clothing or shoes. Here, the cutting process may include: CAD cutting using a knife; laser cutting; or the like. When conducting the cutting process, cutting is performed for a desired pattern to have a depth extending from the hot melt layer 36 up to a portion just before the carrier film 10. Subsequently, the cut portion is separated from the carrier film 10 and is applied to the clothing or shoes by being pressed at 150r for 10 seconds.

FIG. 3 shows a process in which reflection occurs between the glass beads and the glitter particles, when the heat transfer sheet of the present invention is applied to the desired product such as the clothing or shoes. In the case of the glitter sheet, typically, a plurality of fine particles is usually applied to a substrate surface, the diffuse reflection occurs on the surface of these fine particles, deposited and coated with aluminum, whereby an effect in which the coated substrate surface is shiny is obtained. At this time, a slight luminance is produced but a satisfactory reflection effect is not obtained. Therefore, by placing glass beads with a high refractive index of at least 1.9 in front of the glitter particles, the incident light obtained from the light source is refracted toward the glitter particles located at the rear side of the glass beads, and the light reflected from the glitter particles is refracted through the glass beads, whereby the retroreflective effect may be maximized. The glass bead is a retroreflector, which typically functions such that the light (light ray) originated from the light source is refracted while entering into the inside of the glass bead, then reflected at the rear surface of the glass bead, then refracted again while exiting the glass bead, and then reflected toward the light source in a direction parallel to the incident light. Having such characteristics, the retroreflector exhibits excellent visibility even at night or in a dark place, thereby greatly contributing to the safety of workers and the like.

With reference to FIG. 3, the carrier film 10 is removed from the reflective glitter heat transfer sheet 30 immediately before or after conducting heat transfer. Since the glass beads 20 constituting the reflective glitter layer 32 are disposed adjacent to the carrier film 10, when the carrier film 10 is removed, the adhesive 12 attached around the upper hemisphere portion of each of the glass beads 20 is removed together with the carrier film 10. Meanwhile, the adhesive 12 that is attached to the remaining lower hemisphere portion of each of the glass beads 20 and to the glitter powders 22 remains.

As described above, according to the present invention, the glass beads 20 and the glitter particles (glitter powders 22) are arranged using the adhesive 12 evenly attached to the entire surface of the carrier film 10, thereby obtaining a result of being arrayed in one adhesive layer. As such, the glass beads 20 and the glitter particles 22 (glitter powders 22) are provided to be present together in the adhesive 12 providing one layer, whereby homogeneity of the medium between the glass beads 20 and the glitter particles (glitter powder 22) may be obtained. Accordingly, the change in refractive index of light occurring in the adhesive 12 excluding the glass beads 20 and the glitter particles (glitter powder 22) maybe kept constant.

Referring to FIG. 3, when the reflective glitter heat transfer sheet 30 of the present invention is applied to an application product such as the clothing or shoes, some of the light (light rays) originated from the light source (not shown) is refracted while entering as the incident light 44 through the front surface of the glass bead 40 constituting the reflective glitter layer 32 and refracted again while exiting through the rear surface of the glass bead 40, thereby colliding with the glitter particle 42. The light collided with the glitter particles 42 is reflected and then refracted while entering again through the rear surface of the glass bead 40, and refracted once again while exiting through the front surface of the glass bead 40, thereby being retrospectively (reversely) reflected (reflected light 45) toward the light source in a direction parallel to the incident light 44. Here, some of the light collided with the glitter particles 42 is reflected (so-called diffuse reflection) at various angles, so that a glitter effect may be obtained.

On the other hand, as shown in FIG. 3, some of the light (incident light 46) transferred from the light source is: refracted while being incident through the front surface of the glass bead 40' constituting the reflective glitter layer 32; reflected on a surface of rear side of the glass bead 40'; and then refracted again while exiting through the front surface of the glass bead 40', thereby being retrospectively (reversely) reflected (reflected light 47) toward the light source in a direction parallel to the incident light 46. At this time, the light rays (incident light 46) do not reach the glitter particle 42', and retroreflection is performed in the glass bead 40'. However, even in this case, since the visibility due to retroreflection is significantly increased, the reflection associated with the glitter particles is significantly improved as a result.

As described above, since the reflective glitter heat transfer sheet 30 having the retroreflective system according to the present invention is able to obtain a retroreflective effect through both glass beads on the one hand and glass beads and glitter particles on the other hand. Accordingly, it is possible to obtain a reflective glitter sheet having excellent visibility by maximizing the retroreflective effect.

Figure 4:
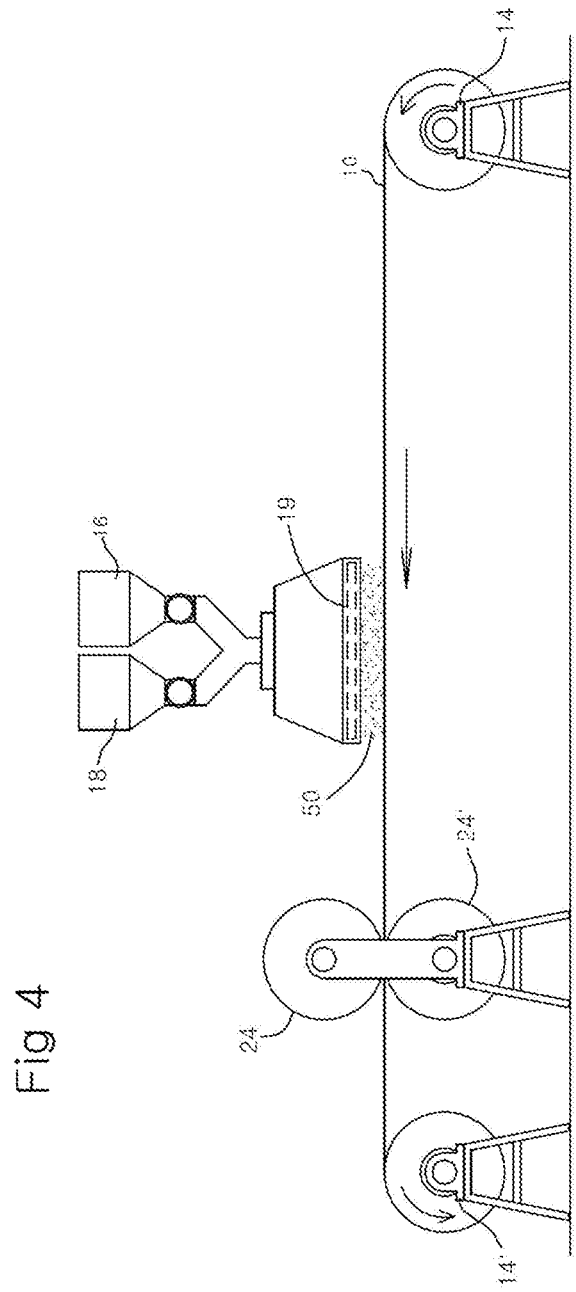
FIG. 4 is a schematic process diagram showing an overall process of manufacturing a reflective glitter heat transfer sheet having a retroreflective structure (system) according to another embodiment of the present invention.

FIG. 4 is a schematic process diagram showing an overall process of manufacturing a reflective glitter heat transfer sheet having a retroreflective structure (system) according to another embodiment of the present invention. Hereinafter, similar components having the same configuration or structure as the reflective glitter heat transfer sheet according to one embodiment of the present invention described above with reference to FIGS. 1 to 3 will be referred to by the same reference numerals. The difference in the implementation of the present invention according to FIG. 4 is that the glass beads and glitter particles are mixed, thereby being simultaneously arranged in the carrier film.

The reflective glitter heat transfer sheet starts with preparing the carrier film (base film) 10. A sheet-like adhesive 12 (see FIG. 5) is provided on the one entire surface of the carrier film 10 along with a carrier film to which a release layer (delamination layer) is attached. While a process of unwinding and winding the carrier film 10 from a right side (winder 14) to a left side (winder 14') proceeds, the carrier film 10 provided with the adhesive 12 moves at a constant speed between two winders 14 and 14'. The release layer that is attached to an opposite surface of the adherend surface where the carrier film 10 and the adhesive 12 are in contact with each other is removed for further work.

While the carrier film 10 moves between the winders 14 and 14', the glass beads 20 and the glitter particles 22 contained in two hoppers 16 and 18, respectively, are mixed and then dropped onto the adhesive 12 attached to the carrier film 10. A mixture 50 of the glass beads 20 and the glitter particles 22 is filtered through a filter mesh 19 of 200 to 250 meshes, and then sprayed on the adhesive 12 attached to the carrier film 10 to be settled on the adhesive.

As such, while the carrier film 10 provided with the adhesive 12 moves between the winders 14 and 14', the carrier film 10, to which the glass beads 20 and the glitter particles 22 are attached, continues passing between a pair of rollers 24 and 24'. While passing between the rollers 24 and 24', the glass beads 20 and the glitter particles 22 provided on the carrier film 10 are more stably adhered to and embedded inside the adhesive 12 provided on the carrier film 10, as shown in FIGS. 3 and 5.

Here, with reference to FIG. 5, as the primer layer 34 is provided under the reflective glitter layer 54, even though the particles (that is, glass beads 20 and the glitter particles 22) are not sufficiently attached to the adhesive 12 when obtaining the reflective glitter layer 54 by mixing and then spraying the glass beads 20 and the glitter particles 22 on the adhesive 12, such defects are compensated later by providing the primer layer 34 through a primer coating operation. Lastly, the hot melt layer 36 is provided, thereby obtaining a reflective glitter heat transfer sheet 52 capable of conducting heat transfer.

Figure 5:
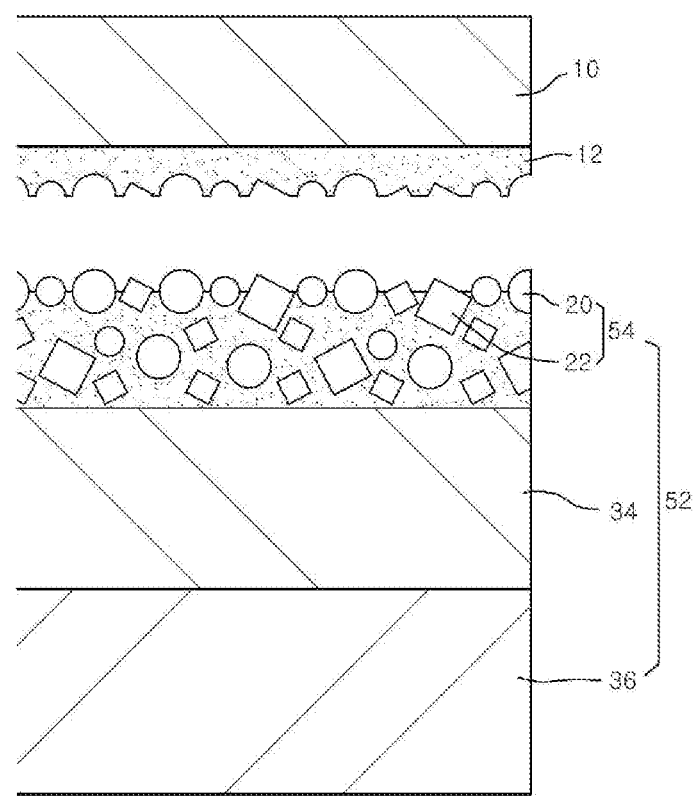
FIG. 5 shows a state in which the carrier film is removed when applied to a desired product as a partially enlarged sectional view showing the heat transfer sheet of the present invention made according to the process of FIG. 4.

FIG. 5 shows a state in which the carrier film 10 is removed when applied to a desired product as a partially enlarged sectional view showing the heat transfer sheet of the present invention made according to the process of FIG. 4. The carrier film 10 is removed from the reflective glitter heat transfer sheet 52 immediately before or after conducting heat transfer. In another embodiment of the present invention, the reflective glitter layer 54 is obtained by mixing the glass beads 20 and the glitter particles 22 and then placing the glass beads 20 and the glitter particles 22 in a state of a mixture in the adhesive 12 of the carrier film 10. Accordingly, the glass beads 20 and the glitter particles 22 are mixed with each other and present together in the adhesive 12. Therefore, when the carrier film 10 is removed, the adhesive 12 attached to the upper hemisphere portion of each of the glass beads 20 that are disposed adjacent to the carrier film 10 is removed together with the carrier film 10. Meanwhile, the adhesive 12, which is attached to the upper portion of each of the glitter particles disposed adjacent to the carrier film 10 by being mixed between the glass beads 20, is also removed together with the carrier film 10. However, the adhesive 12 attached to the lower hemisphere portion of each of the glass beads 20 and the lower portion of each of the glitter particles 22 remains as it is. The difference in the particle size of each of the glass beads 20 and the glitter powders 22 arranged in the adhesive 12 causes a phenomenon described above because, when the size of the mesh is constant, particles passing through the mesh have sizes smaller than the size of the mesh.

According to another embodiment of the present invention, the glass beads 20 and the glitter particles 22 are arranged using the adhesive 12 evenly attached to the entire surface of the carrier film 10, thereby obtaining a result of being arrayed in one adhesive layer. As such, the glass beads 20 and the glitter particles 22 are provided to be present together in the adhesive 12 providing one layer, whereby homogeneity of the medium between the glass beads 20 and the glitter particles 22 may be obtained. In addition, accordingly, the change in refractive index of light occurring in the adhesive 12 excluding the glass beads 20 and the glitter particles 22 may be kept constant.

In the reflective glitter thermal transfer sheet 52 according to another embodiment of the present invention, the light transfer path occurs in a complex manner. First, looking at one possible light transfer path, when the reflective glitter heat transfer sheet 52 of the present invention is applied to an application product such as clothing or shoes, some of the light (light rays) originated from the light source (not shown) is refracted while entering as the incident light through the front surface of the glass bead 20 constituting the reflective glitter layer 54 and refracted again while exiting through the rear surface of the glass bead 20, thereby colliding with the glitter particle 22. The light collided with the glitter particle 22 is reflected and then refracted while entering again through the rear surface of the glass bead 20, and refracted once again while exiting through the front surface of the glass bead 20, thereby being retrospectively (reversely) reflected toward the light source in a direction parallel to the incident light. The transfer path of light (light ray) may occur between the glass bead 20 and the glass bead 20, between the glitter particle 22 and the glitter particle 22, and between the glitter particle 22 and the glass bead 20. Here, for light (light rays) that reached through whatever paths, some of the light collided with the glitter particle 22 is reflected (diffuse reflection) at various angles, so that a glitter effect may be obtained.

On the other hand, some of the light transferred from the light source is: refracted while being incident through the front surface of the glass bead 20 having the upper hemisphere portion exposed above the front surface (based on the drawing) of the reflective glitter layer 54; reflected on the surface of the rear side of the glass bead 20; and then refracted again while exiting through the front surface of the glass bead 20, thereby being retrospectively reflected toward the light source in a direction parallel to the incident light. At this time, the light rays do not reach the glitter particle 22, and retroreflection is performed in the glass beads 20.

However, even in this case, since the visibility due to retroreflection is significantly increased, the reflection associated with the glitter particles is significantly improved as a result.

In contrast, some of the light transferred from the light source may be reflected on the surface of the glitter 22 having the upper hemisphere portion exposed above the front surface (based on the drawing) of the reflective glitter layer 54. At this time, it is possible to obtain only the result (glitter) due to the diffuse reflection by the glitter particles.

As described above, the reflective glitter heat transfer sheet 52 having the retroreflective system according to still another embodiment of the present invention may obtain both retroreflective effect and normal reflection (diffuse reflection) because the path of light propagation occurs in a complex manner between the glass beads and the glitter particles, whereby the reflective glitter sheet having excellent visibility may be obtained.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A reflective glitter heat transfer sheet having a retroreflective structure, the reflective glitter heat transfer sheet comprising:
    a carrier film;
    a reflective glitter layer disposed on the carrier film;
    a primer layer disposed on the reflective glitter layer; and
    a hot melt layer formed on the primer layer for conducting heat transfer,
    wherein the reflective glitter layer comprises: a sheet-like adhesive, and glass beads and glitter particles embedded and arranged inside the sheet-like adhesive, each of the glass beads being a retroreflector for achieving retroreflection, and each of the glitter particles being a reflector for achieving diffuse reflection, and
    wherein the glass beads are arranged biasedly towards the carrier film and the glitter particles are arranged biasedly towards the primer layer.

2. The reflective glitter heat transfer sheet of claim 1, wherein the glass beads and the glitter particles are partially mixed with each other.

* * * * *